(12) United States Patent
Seaman et al.

(10) Patent No.: US 11,848,854 B1
(45) Date of Patent: *Dec. 19, 2023

(54) METHOD, APPARATUS, AND COMPUTER PROGRAM PRODUCT FOR DYNAMIC SECURITY BASED GRID ROUTING

(71) Applicant: FEDERAL HOME LOAN MORTGAGE CORPORATION, McLean, VA (US)

(72) Inventors: James W. Seaman, Falls Church, VA (US); Elizabeth M. Charboneau, Reston, VA (US)

(73) Assignee: FEDERAL HOME LOAN MORTGAGE CORPORATION, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,381

(22) Filed: Oct. 8, 2021

Related U.S. Application Data

(63) Continuation of application No. 16/296,715, filed on Mar. 8, 2019, now Pat. No. 11,146,478, which is a continuation of application No. 15/294,069, filed on Oct. 14, 2016, now Pat. No. 10,263,880, which is a continuation of application No. 11/567,572, filed on Dec. 6, 2006, now Pat. No. 9,531,580.

(51) Int. Cl.
| | |
|---|---|
| *G06F 9/46* | (2006.01) |
| *H04L 45/02* | (2022.01) |
| *G06F 21/62* | (2013.01) |
| *H04L 69/329* | (2022.01) |
| *H04L 9/40* | (2022.01) |
| *H04L 67/1097* | (2022.01) |
| *H04L 67/10* | (2022.01) |

(52) U.S. Cl.
CPC .......... *H04L 45/04* (2013.01); *G06F 21/6218* (2013.01); *H04L 9/40* (2022.05); *H04L 63/10* (2013.01); *H04L 69/329* (2013.01); *H04L 67/10* (2013.01); *H04L 67/1097* (2013.01)

(58) Field of Classification Search
CPC . H04L 45/04; H04L 9/40; H04L 63/10; H04L 69/329; H04L 67/10; H04L 67/1097; G06F 21/6218
See application file for complete search history.

(56) References Cited

U.S. PATENT DOCUMENTS

| | | |
|---|---|---|
| 4,891,803 A | 1/1990 | Huang et al. |
| 5,638,448 A | 6/1997 | Nguyen |
| 6,597,957 B1 | 7/2003 | Beakley |
| 6,768,738 B1 | 7/2004 | Yazaki |
| 6,775,657 B1 | 8/2004 | Baker |
| 7,058,600 B1 | 6/2006 | Combar |

(Continued)

OTHER PUBLICATIONS

IEEE: Shahinzadeh, "Security technology by using firewall for smart grid," Bulletin of Electrical Engineering and Informatics, vol. 5, No. 3, pp. 366-372, 2016 (Year: 2016).*

*Primary Examiner* — Lan-Huong Truong
(74) *Attorney, Agent, or Firm* — MH2 TECHNOLOGY LAW GROUP, LLP

(57) ABSTRACT

A method of routing data that is part of a grid job including steps of: receiving a data packet at a routing device; determining whether the data packet is identified as part of a grid job; and routing the data packet that is identified as part of a grid job through the Internet to an external node.

20 Claims, 6 Drawing Sheets

(56) References Cited

U.S. PATENT DOCUMENTS

| | | |
|---|---|---|
| 7,174,018 B1 | 2/2007 | Patil et al. |
| 7,307,988 B1* | 12/2007 | Park ..................... H04L 45/745 |
| | | 370/428 |
| 7,385,957 B2 | 6/2008 | O'Neill |
| 7,406,691 B2 | 7/2008 | Fellenstein et al. |
| 7,451,483 B2 | 11/2008 | Chang et al. |
| 7,509,434 B1 | 3/2009 | Crosmer et al. |
| 7,606,902 B2* | 10/2009 | Rao ........................ H04L 45/72 |
| | | 709/224 |
| 7,784,056 B2 | 8/2010 | Berstis et al. |
| 7,813,346 B1* | 10/2010 | Kuwabara ............... H04L 45/54 |
| | | 370/235 |
| 7,937,578 B2 | 5/2011 | O'Neill |
| 9,680,750 B2 | 6/2017 | Casado et al. |
| 2002/0023270 A1 | 2/2002 | Thomas et al. |
| 2002/0141408 A1 | 10/2002 | Chang |
| 2003/0065950 A1* | 4/2003 | Yarborough ........ H04L 63/0281 |
| | | 726/4 |
| 2003/0103499 A1 | 6/2003 | Davis |
| 2004/0095913 A1 | 5/2004 | Westphal |
| 2004/0162871 A1* | 8/2004 | Pabla .................. H04L 67/1046 |
| | | 709/201 |
| 2004/0193461 A1 | 9/2004 | Keohane et al. |
| 2004/0205751 A1 | 10/2004 | Berkowitz |
| 2005/0102514 A1 | 5/2005 | Bergenwall et al. |
| 2005/0154789 A1 | 7/2005 | Fellenstein et al. |
| 2005/0188088 A1 | 8/2005 | Fellenstein |
| 2005/0193222 A1 | 9/2005 | Greene |
| 2005/0246547 A1 | 11/2005 | Oswald et al. |
| 2006/0048157 A1 | 3/2006 | Dawson et al. |
| 2006/0149652 A1 | 7/2006 | Fellenstein et al. |
| 2006/0149714 A1 | 7/2006 | Fellenstein et al. |
| 2006/0149842 A1 | 7/2006 | Dawson |
| 2006/0167828 A1 | 7/2006 | Di Luoffo et al. |
| 2006/0191002 A1 | 8/2006 | Lee et al. |
| 2006/0265402 A1 | 11/2006 | Edmond et al. |
| 2006/0265436 A1 | 11/2006 | Edmond et al. |
| 2006/0265689 A1 | 11/2006 | Kuznetsov et al. |
| 2006/0271601 A1 | 11/2006 | Fatula et al. |
| 2007/0016590 A1* | 1/2007 | Appleby et al. |
| 2007/0038703 A1 | 2/2007 | Tendjoukian et al. |
| 2007/0118839 A1* | 5/2007 | Berstis ................. G06F 9/5072 |
| | | 718/105 |
| 2007/0157303 A1* | 7/2007 | Pankratov ............ H04L 63/029 |
| | | 726/11 |
| 2007/0157307 A1* | 7/2007 | Katoh .................. H04L 63/105 |
| | | 726/14 |
| 2007/0159971 A1 | 7/2007 | Zhang et al. |
| 2007/0261112 A1 | 11/2007 | Todd |
| 2008/0101367 A1 | 5/2008 | Weinman |
| 2013/0346472 A1 | 12/2013 | Wheeldon |

* cited by examiner

| Resource ID | Resource type | Security class | Route to resource |
|---|---|---|---|
| 101 | IBM p570 | C3 | 0002554FA813: 0002554FA814: 0002553A074E |
| 102 | IBM p595 | C4 | 0002554FD619: 0002554FC204: 0002553B193D |

FIG. 4

METHOD, APPARATUS, AND COMPUTER PROGRAM PRODUCT FOR DYNAMIC SECURITY BASED GRID ROUTING

BACKGROUND OF THE INVENTION

Cross Reference to Related Applications

This application is a continuation application of and claims the benefit of priority under 35 U.S.C. § 120 to U.S. application Ser. No. 16/296,715, filed Mar. 8, 2019, which is a continuation application of U.S. application Ser. No. 15/294,069, filed Oct. 14, 2016, now U.S. Pat. No. 10,263,880, which is a continuation application of U.S. application Ser. No. 11/567,572, filed Dec. 6, 2006, now U.S. Pat. No. 9,531,580, which includes subject matter related to U.S. application Ser. No. 11/147,227, filed on Jun. 8, 2005, now U.S. Pat. No. 7,823,185. The benefit of priority is claimed to each of the foregoing, and the entire contents of each of the foregoing are incorporated herein by reference.

FIELD OF THE INVENTION

The invention relates generally to grid enabled computing environments, and particularly to an apparatus, method, and computer program product for dynamic security based routing, which increases the calculation and/or processing resources available for grid job processing, while maintaining specific levels of security.

DESCRIPTION OF THE RELATED ART

A grid job is a computer processing job that is portioned out across a plurality of processors over an unbounded network such as the Internet. Grid job processing is often employed when large processing jobs must be carried out, but only limited processing capabilities are available. For example, mathematical modeling of economic systems, global weather patterns or weapons systems involves complex calculations that require more processing resources than are typically available in conventional processors.

Large processing jobs may be carried out by dividing the job into many smaller jobs and distributing the jobs to a plurality of processors. When the processing capability of more than one processor is used to carry out complex processing tasks, the processing resources are known as shared resources. Utilizing shared resources to carry out processing of data that may undergo analysis in a non-sequential manner is an especially attractive use of shared processing.

Large processing jobs may also be carried out on a single processor capable of carrying out complex processing tasks. Individual, self-contained computers capable of carrying out complex processing are often referred to as "supercomputers" and include those made by the Cray Corporation. Supercomputers are relatively few in number.

The processing capability of a supercomputer is defined by the number of calculations that the supercomputer can carry out per unit of time. The total computing time available on a supercomputer is limited by the demand for the computer's processing resources and the number of calculations per unit of time that the computer can carry out. The demand for computing time is usually greater than the processing capability of the computer. If supercomputers were the only resource available for carrying out complex processing, it would not be possible to meet the demand for complex processing and a severe shortage of complex processing resources would be evident.

Shared resources can be used to carry out complex processing by utilizing the processing capabilities of many smaller computers in parallel. Cumulatively, the processing capabilities of many smaller processors may be equivalent to the processing capabilities of a single supercomputer. Purchasing many smaller computers instead of a single supercomputer may not be an economically acceptable way to carry out complex processing because the costs associated with the purchase of many individual computers is greater than the cost of a single supercomputer.

The processing resources of most individual computers are only partially used. Computer technologists have found that this unutilized or underutilized processing capability can be used at little or no cost. These processing resources are accessible, for example, over networks such as the Internet or intranets that inexpensively interconnect many computers. By bundling the processing capabilities of many individual computers, e.g., by connecting the individual computers in a network, it is possible to assemble the processing capability needed to carry out complex calculations and avoid the need for purchasing an expensive supercomputer-type processor.

The sharing of processing capability over many computers connected to one another over an unbounded network is referred to as grid computing. The term "grid" is used to represent a physically interconnected network of individual processors, each having a certain processing capability.

Grid computing is thought to have started within universities. Universities often lacked the internal computing resources needed to carry out the calculations needed to model complex systems. To overcome this lack of resources, universities began to share their computing resources with each other. For example, a first university may have 50 servers and a second university may have 50 servers. At any given point in time, a processing job could be portioned among the 100 servers of the first and second universities. By using such grid systems both the first and second universities could better schedule and apportion their available processing time and gain greater efficiency from their computer processing resources. The degree to which additional exterior resources (e.g., the processing capability separate from the processing capability of a central computer or core of computers) can be interconnected to carry out processing is referred to as parallelism.

Grid computing suffers from a significant shortcoming in that the security and/or privacy of the data that is processed with the use of external resources (e.g., shared resources and/or processing capability) cannot be guaranteed. Data sent outside of a secure network may be subject to a substantial risk of interception, disclosure and/or corruption.

With heightened emphasis being placed upon maintaining the security (e.g., the confidentiality) of certain types of information such as personal information, it has become more difficult to utilize shared processing resources for certain applications. Such security-sensitive applications include the transfer, storage and/or use of financial data such as the individual financial transactions and/or obligations associated with a particular individual.

As a greater amount of secure data is generated more methods for analyzing this data are developed. This in turn provides richer databases requiring even greater security protection. As the amount of security-sensitive information and/or data increases, there is a greater need for improved security.

It is desirable to use shared resources to the greatest extent possible in order to achieve greater processing efficiency; however, there is a concurrent need to carry out the processing of sensitive data only within environments wherein the data undergoing processing is safe from disclosure, corruption, and/or interception by any party other than the party submitting a processing job.

True grid computing (e.g., unbounded utilization of shared resources over the Internet) is not widely used today due in part to impediments presented by the necessity for interconnecting disparate processing resources. In a conventional grid, different processing resources are interconnected by conventional network routing which is "specific permission" routing. The security and organizational protocols used with specific permission routing generally allow network traffic (e.g., communications between different processors) to flow only when the traffic is permitted by a routing apparatus (typically a router or a firewall). A firewall is a gateway that limits access between networks in accordance with a local security policy. The two networks separated by the firewall are in two separate computer environments.

Communications between processing resources usually occurs by sending "packets" of digitized information from one processor to another processor over a network connection. The packets contain a portion of the total information (e.g., the data undergoing processing) of the processing job. Each packet is identified by a destination address and an origin address, in addition to other information. The packet must include sufficient information to be recognized by the router as it leaves and/or enters a network.

A network may include as few as two computers or may include an unlimited number of computers, such as the environment of computers interconnected by the Internet. The internetworking of computers may be accomplished through a series of hubs (e.g., routers and/or servers). The communication taking place over a network is typically controlled by a router which organizes the information flow so that communication between many computers can be directed seamlessly over a single connection (e.g., telephone and/or data line).

Routing is an important determinant of the characteristics of any process or method that utilizes shared processing resources. A restrictive routing scheme is preferred for processing of information that requires a high level of security. High security can be achieved through the routing infrastructure. For example, a firewall may be used to restrict the egress of the data outside of a defined computing environment such as a grid cluster, and likewise prevent the ingress of data which might infect or corrupt the data undergoing processing.

In conventional routing, the router or firewall is programmed to recognize specific addresses or a specific range of addresses and based on this identifying information, permits packets having such addresses to flow across the firewall. Packet information typically has a destination address, which allows routing the packet information routed through various routers to its final destination. If a firewall allows an information packet to pass (i.e., the address of the packet falls within the specific range of permissible addresses or is a specifically permitted address), the firewall allows the packet to communicate with another processor located outside of the network.

A router may be configured so that communication between processing resources (e.g., http based traffic) is permitted only within the confines of a network that includes only a limited number of processors each uniquely identifiable (e.g., a bounded grid known as a grid cluster). Communication with processors outside of the network is not permitted by the router which is programmed to permit communication only between certain predefined destinations (e.g., only between the uniquely identifiable computers of the network). Data packets containing address information identifying a destination (e.g., processor) outside the predefined network are not permitted to exit the defined network.

Conventional routing is static meaning that once a routing rule is in place, all network traffic must conform to that rule. Static routing is the most widely used method of network traffic routing because it allows for good security control over networks and any attached devices.

Static routing security is not optimal for grid-enabled processing. In a true grid environment, the processing workload is spread as broadly as possible across as many networks and devices as possible in order to maximize job resources, parallelism, and performance. It is difficult to reconcile the need to increase parallelism with traditional routing methods because the inclusion of additional processing resources in a network may compromise the security of the network.

Although the advantages of grid computing are now being more widely recognized, limitations such as grid specific routing techniques and security concerns, have restricted most efforts at grid processing to clusters of processing resources instead of unlimited grid environments such as the Internet. Any computing cluster has grid resources, such as computers, that are typically secured within a corporate subnet, intranet or network. The routing rules of such a computer cluster usually do not allow grid traffic to flow freely among all possible grid resources, as would be the case in a true grid environment (e.g., unsecured Internet communication).

FIG. 1 contrasts a grid-cluster with a true grid environment (e.g., an unrestricted grid environment). Grid-cluster 10 consists of only enterprise subnet or network 1 and enterprise subnet or network 2. Enterprise subnet or network 1 includes corporate computers 1A, 1B, 1C, and corporate router 3A. Enterprise subnet or network 2 includes computers 2A, 2B, 2C, and corporate router 3B. These subnets or networks, and associated resources, may be physically separated from other processors, e.g., located within the confines of the corporation, or may be separated from other processors by certain security protocols. The defining characteristic of grid-clusters is that they keep all traffic within the walls of the corporation. Internet routed networks and resources 12 provide those components that must be added to a grid-cluster 10 in order to achieve true grid computing. True grid computing is realized when a grid job is spread to all available resources, including resources (e.g., processors) physically separated from the enterprise or separated from the enterprise by a security protocol or screen. As shown in FIG. 1, with the addition of Internet routed networks and resources 12, a grid job originating from the corporation having a subnet, intranet, or network 10, is spread via router 5 to resources available over the Internet including computers 4A, 4B, and 4C.

As shown by FIG. 1, to employ true grid computing, a processing job must be communicated beyond the resources of its originator (e.g., a company or a company's internal grid-cluster) to the Internet. This cannot be achieved by conventional network routing which functions to halt specific traffic from passing through a firewall or router.

As mentioned above, conventional static routing is unsuitable for grid enabled processing. Grid enabled processing preferably includes the capability to dynamically locate and identify processing resources outside of an internal grid-cluster. Such dynamically located and identified processing resources may not have a known address when a grid job is started. A packet that is a part of a grid job does not necessarily include an address but may still communicate with other processing resources. In the case of conventional routing, the absence of an address causes the router to block communication by prohibiting packets from leaving the electronic or physical confines of an internal grid-cluster.

Grid-cluster computing is commonly mistaken for true grid computing. True grid computing includes the free flow and free use of any resource on the Internet. Grid clusters or multiclusters are not true grid computing because they do not utilize (nor have the capability to utilize) or communicate with resources that are not part of a defined cluster.

The increasing demand for computer processing resources has created a need for ways to better manage and maximize existing processing resources. Substantial economies of scale may be realized by better utilizing or reducing the amount of computer processing resources needed to fulfill the processing requirements of many business, governmental and academic users. Rather than buying new, expensive, specialized equipment to increase processing power, grid computing may be used to distribute processing jobs over a plurality of processors and thus allow fewer or less expensive processing resources to be purchased and maintained. A system that securely uses a plurality of computers for a particular processing job may also increase the speed for completing any particular processing job. A job that may take three weeks using only the limited resources of a single processor or a grid cluster may be completed in as little as 24 hours by using methods and equipment to better manage existing processing resources.

SUMMARY OF THE INVENTION

An object of the present invention is to address the above-identified and other limitations of conventional routing and grid and/or grid cluster processing.

In a non-limiting embodiment of the present invention, a method of routing data that is part of a grid job, includes steps of: receiving a data packet at a routing device in a first computer environment; determining whether the data packet is identified as part of the grid job; and routing the data packet that is identified as part of the grid job through the Internet to a node in a second computer environment.

In another non-limiting embodiment of the present invention, a method of routing a portion of a grid job between two separate computer environments includes steps of: receiving an instruction at a processor to begin execution of the grid job; determining job requirements for the grid job; dispatching a grid-router agent whereby the grid-router agent is routed from a first computer environment to a second computer environment, wherein the first computer environment and the second computer environment are separated by a firewall, and the firewall examines a header of the grid-router agent and routes the grid-router agent to the Internet if the header identifies the grid-router agent as part of the grid job; receiving information from the grid-router agent; and recording the information in a table.

In another non-limiting embodiment of the present invention, a computer program product encoded with instruction which when executed by a computer cause the computer to perform a method of routing data that is part of a grid job, the method including steps of: receiving a data packet at a routing device in a first computer environment; determining whether the data packet is identified as part of the grid job; and routing the data packet that is identified as part of the grid job through the Internet to a node in a second computer environment.

In another non-limiting embodiment of the present invention, a computer program product encoded with instructions which when executed by a computer cause the computer to perform a method of routing a portion of a grid job between two separate computer environments, the method including steps of: receiving an instruction at a processor to begin execution of the grid job; determining job requirements for the grid job; dispatching a grid-router agent whereby the grid-router agent is routed from a first computer environment to a second computer environment, wherein the first computer environment and the second computer environment are separated by a firewall, and the firewall examines a header of the grid-router agent and routes the grid-router agent to the Internet if the header identifies the grid-router agent as part of the grid job; receiving information from the grid-router agent; and recording the information in a table.

In another non-limiting embodiment of the present invention, a system configured to route data that is part of a grid job includes: a receiving unit configured to receive a data packet at a routing device in a first computer environment; a determining unit configured to determine whether the data packet is identified as part of the grid job; and a routing unit configured to route the data packet that is identified as part of the grid job through the Internet to a node in a second computer environment.

In another non-limiting embodiment of the present invention, a system configured to route a portion of a grid job between two separate computer environments includes: a processor configured to receive an instruction to begin execution of the grid job; a determining unit configured to determine job requirements for the grid job; a dispatching unit configured to dispatch a grid-router agent whereby the grid-router agent is routed from a first computer environment to a second computer environment, wherein the first computer environment and the second computer environment are separated by a firewall, and the firewall is configured to examine a header of the grid-router agent and to route the grid-router agent to the Internet if the header identifies the grid-router agent as part of the grid job; a receiving unit configured to receive information from the grid-router agent; and a recording unit configured to record the information in a table.

One object of the invention is to provide a method for utilizing the processing resources of a grid to carry out processing of data.

Another object of the invention is to provide a method for utilizing the processing resources of a grid to carry out processing of data in a manner that maintains the security, confidentiality and reliability of the data.

Another object of the invention is to provide a system for using grid processing of data over two or more intranets, subnets, grid clusters and/or a grid.

Another object of the invention is to provide a system for using grid processing of secure data over the Internet.

Another object of the invention is to provide a method that includes assigning a security level to a processing job and determining whether the processing job may be carried out on a grid cluster or a grid.

Another object of the invention is to provide a method that includes scheduling one or more processing jobs on a grid and/or a grid cluster; including instructions for parsing, scheduling executing and assembling portions of the processing job.

Another object of the invention is to provide a method that includes finding processing resources available over a grid or a grid cluster, assigning a security level to the resources, then dispatching processing jobs to the resources according to a predetermined hierarchy and/or security level.

Another object of the invention is to provide a method that tracks the progress of processing jobs submitted to a grid or grid cluster for processing, and reporting the progress of the processing.

In another embodiment of the invention, the router acts as a security threshold to search and analyze any incoming process data to determine if the data has been corrupted or otherwise infected with data and/or programs that may damage the data later.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an exemplary table generated by an embodiment of the invention;

DETAILED DESCRIPTION OF THE PREFERRED EMBODIMENTS

Reference will now be made in detail to exemplary embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Figure 1:
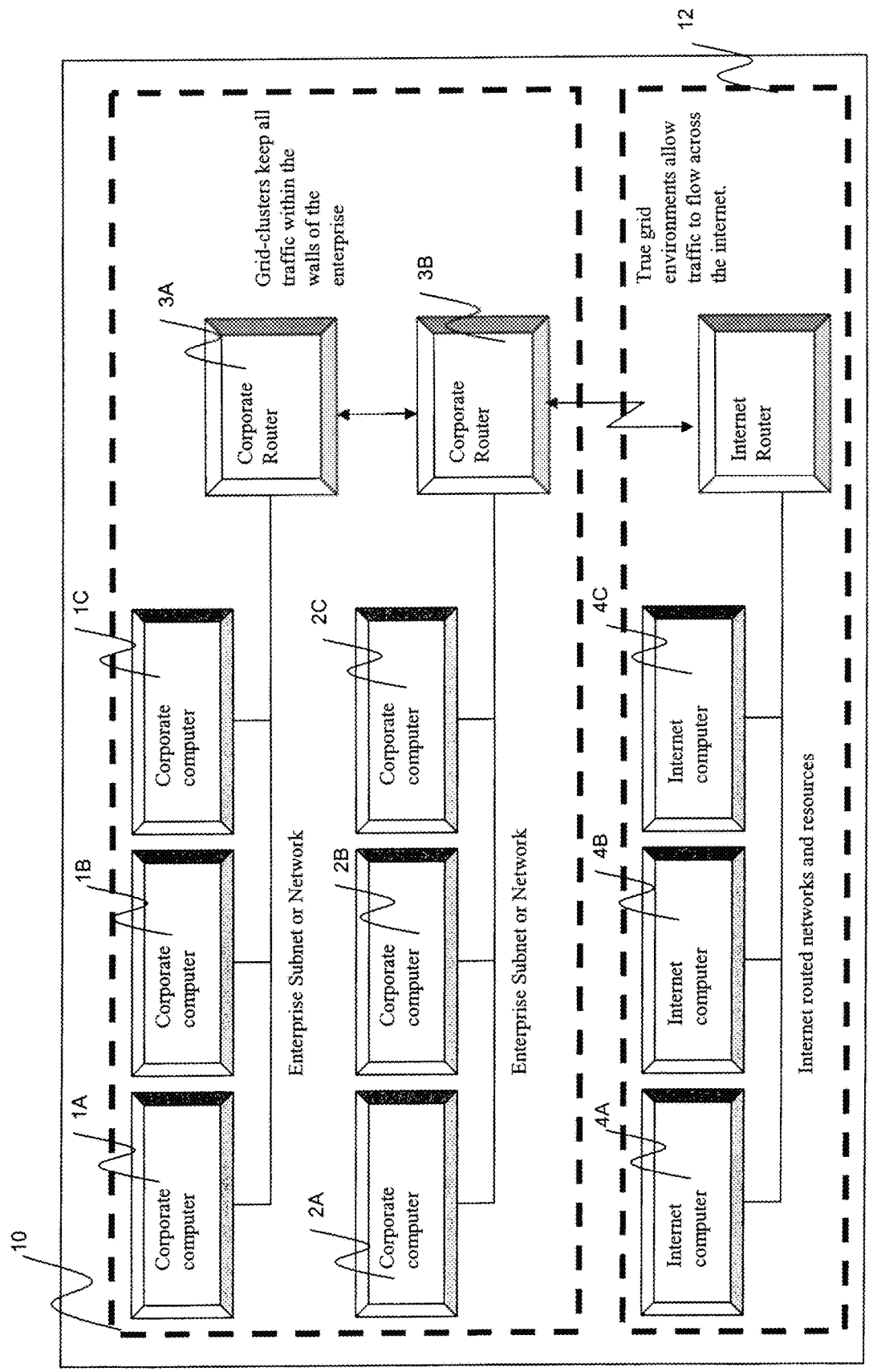
FIG. 1 is a block diagram showing a grid cluster and a grid environment.
Figure 2:
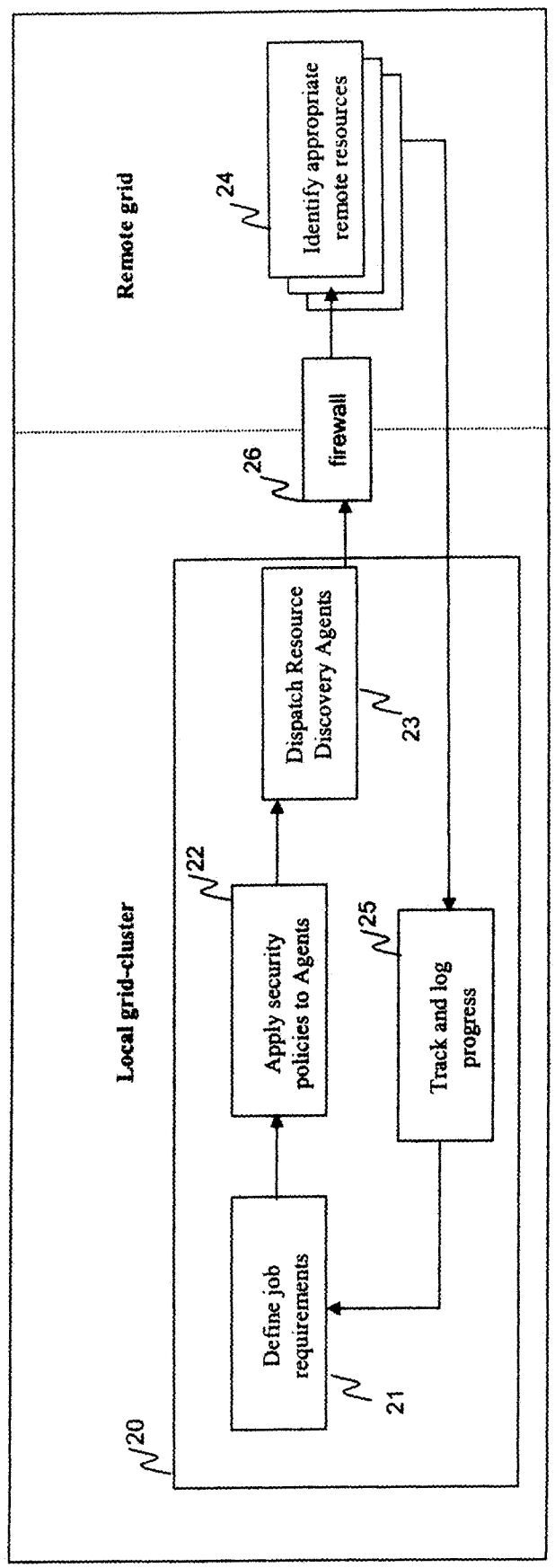
FIG. 2 is a block diagram of an embodiment of the invention.

FIG. 2 is a block diagram of a grid router 20, which is connected to a remote resource or resources 24. The grid router includes grid-router manager 21, grid-router dispatcher 22, grid-router agents 23, grid router tracker table 25, and firewall or routing device 26.

Grid-router manager is responsible for the overall management of the grid job routing process. In a preferred embodiment, the manager would read data submitted through a grid scheduler (see U.S. patent application Ser. No. 11/147,227) and would determine the degree of parallelism required for the grid job. The grid-router manager can also determine other grid-job definitions such as the type of platform to be used, and security requirements. However, determining security is optional and depends on the nature of the grid job itself.

In another exemplary embodiment, grid-router manager 21 captures grid-job data in real time as the scheduler submits the grid jobs for execution. In this embodiment, grid-router manager 21 does not determine the degree of parallelism before interacting with the grid-router dispatcher. Rather, the grid-router manager 21 instructs grid-router dispatcher 22 to release grid-router agents without determining the degree of parallelism. This embodiment will utilize all the versions that can be identified and will continue to search for additional resources until the grid job is completed. A grid-router agent may be a daemon process, API, or a software module that can collect data with respect to specific grid devices and report back to router 20.

In one embodiment, as an agent finds available resources, portions of a processing job are immediately parsed and assigned to the available resources for calculation. As the agent continues searching and identifying other available resources, the agent continually updates the total job and determines when no further resources are necessary or when all of the processing and/or calculations are complete.

The agent may be provided with a temporal limit for finding resources. An agent may be programmed to find and/or identify processing resources that are available or will become available within a given period of time. For example, the agent may look for processing resources that are immediately available and will be available for a definite period of time after their identification. This permits certain processing jobs to be parsed into particular packets and/or sub jobs in a manner that provides a degree of certainty that each of the sub jobs will be complete for reassembly. Such an embodiment of the invention is especially preferred for processing of data that must be carried out in a sequential manner. Moreover, a timed agent will limit its own search efforts to maximize its efficiency and minimize its burden on bandwidth.

In one embodiment, as an agent finds available resources, portions of a processing job are immediately parsed and assigned to the available resources for calculation. As the agent continues searching and identifying other available resources, the agent continually updates the total job and determines when no further resources are necessary or when all of the processing and/or calculations are complete.

In another exemplary embodiment, grid-router manager 21 queues, or causes to be queued, a grid job until remote resources are discovered by the agents. Once all resources, or predetermined number of resources as defined in a job initialization policy are discovered, grid-router manager would initiate, or cause to be initiated, the release of the specified grid job to be executed by the remote resources discovered by the agents.

In another exemplary embodiment, the grid-router manager initiates the release of the specified grid-job when a predetermined number of remote resources are discovered. Then, after the grid-job execution has begun, additional resources are added, as they are discovered, to the pool of resources already executing the grid job. The predetermined number of remote resources may be as few as one.

Grid-router dispatcher 22 is responsible for dispatching specific grid-routing agents. The number of grid-routing agents needed to satisfy a given grid job is specified by grid-router manager 21. These grid-routing agents could be pulled from an active pool of running agents, or could be started on demand by the dispatcher.

In an exemplary embodiment, the grid-routing agents are pre-configured with security requirements, and the grid-router dispatcher would release the agents when instructed to. However, the grid-routing agents may also be generic in nature. If the grid job required security, grid-router dispatcher would apply security policy requested by grid-router manager 21, to the agent prior to dispatching.

The routing and/or security levels for information destined to pass through the security threshold may be assigned or determined by the degree of security assigned to the data and/or the complexity of the processing to which the data is subjected. A highly complex processing which could not withstand even minor corruption may be assigned a high security and/or complexity level and may then be routed to only certain shared resources whereupon the processing could be carried out to the desired degree of certainty.

Grid-router agent 23 is the active process the traverses the Internet in search of remote resources. Remote resources refer to nodes outside the internal network of an enterprise that is the source of the grid job, and is reached by traversing an external network such as the Internet. Grid-router agent 23 establishes a route to a remote resource that satisfies the requirements of the grid job. For example, if a security policy is in place, the remote resource would need to satisfy the security policy. The requirements of the grid job do not need to be security related. The remote node may need to use a specified level of encryption, be running a specified operating system, operating on a specified platform, require a specified level of virus protection, and etc. Grid-router agent 23 communicates with each grid resource discovered and interrogates the resource as to its security policies, processing speed and other grid-job requirements. Grid-router agent 23 then reports back to grid-tracker 25, discussed below, as suitable remote resources are identified.

Grid-router agent 23 uses an existing protocol, such as TCP/IP to communicate with potential remote resources. TCP/IP is only an exemplary protocol that can be used. Grid-router agent 23 can use any protocol that enables communication with the potential remote resources. TCP/IP is used as an example because it is a widely used protocol.

In an exemplary embodiment, the grid-router agent 23 is generic in nature. The grid-router is then programmed by the grid-router dispatcher 22 as needed. For example, grid-router dispatcher 22 dispatches grid-router agent 23 with a requisite level of security.

In an alternative embodiment, grid-router agents 23 are pre-programmed with a level of security. In addition, grid-router agents may be pre-programmed with different levels of security. The grid-router agents may then be classified into different groups (i.e., class 1, class 2, class 3, . . . class n grid-router agents). For example, a class 1 grid-router agent could be the most secure by having the most stringent security requirements. A class 5 grid-router agent could be the least secure by not requiring any security check for the remote resource.

In another embodiment, the grid-router agent would be programmed with the specific security requirements for the grid job. A person of ordinary skill in the art will recognize that many possible parameters could be specified as security concerns. Possible security concerns include the operating system running on the remote resource, security applications running on the remote resource, the specified hardware running on the remote resource, and so forth.

Figure 3:
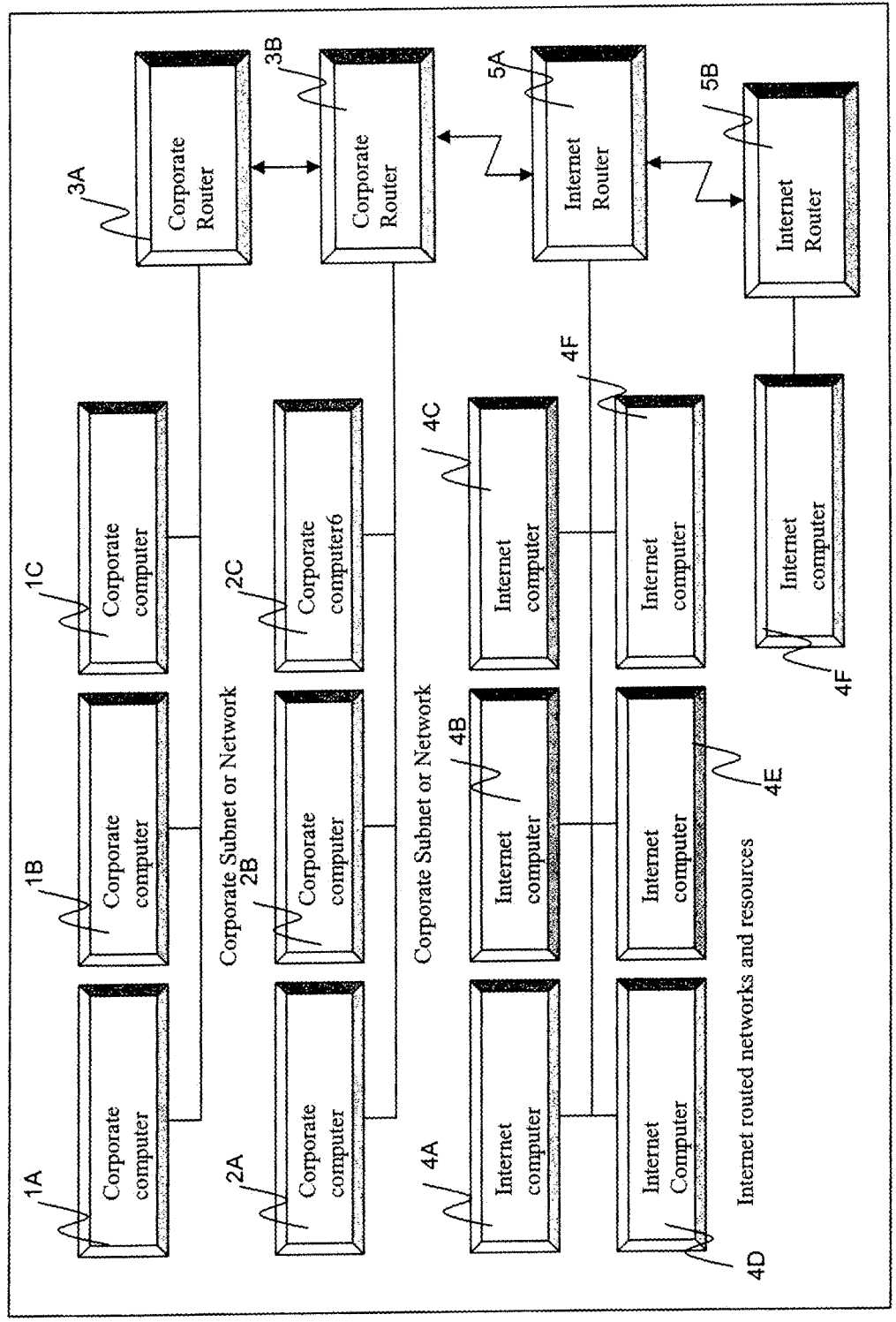
FIG. 3 is a block diagram indicating resources identified for a use in a grid job by an embodiment of the invention.

FIG. 3 is a block diagram of grid environment where grid-router agents have identified three grid-resources (i.e., dark boxes 4B, 4C, and 4E) that can be used to process the grid job. Reference numerals used previously continue to have the same meaning. Internet resources 4A, 4D, 4F and 4E were not selected for the processing of the grid job. The grid-routing agents will transmit routing data for these three remote resources back to grid-tracker 25.

Grid-router tracker 25 is responsible for collecting and maintaining routing data from active grid-routing agents. In a preferred embodiment, the data received from the grid-router agents is stored in table format, both in real memory for active use, and on a writeable media for possible future reference.

FIG. 4 shows an exemplary tracking table 40. Tracking table 40 includes data such as: a resource identifier 41, resource type 42, the security class of the remote resource 43, and routing required to access the remote resource 44. The route 44 shows the MAC address of the remote resource being used to execute the grid job. A person of ordinary skill in the art will recognize that other information about the remote resources may be included in the routing table.

In an exemplary embodiment of the present invention, the routing table would be built from scratch for each grid job execution. In an alternative embodiment of the present invention, data from a previously stored routing table could be read and reused from either the real memory or the writeable media storing the previously created routing table for subsequent grid job resource identification.

In an exemplary embodiment of the present invention, data in a previously created routing table is reused in conjunction with the grid-routing agent. The grid-routing agent will verify that the data in the previously created routing table has not changed. For example, a previously used remote resource may have a different security level, or may no longer exist.

The grid-router tracker 25 also updates the grid-router manager with the status of the grid-router agent processes, and identification of remote resources.

Firewall 26 operates as a gate that allows data packets, which in one embodiment are the grid-tracker agents, to be routed through the Internet. A firewall is a hardware or software solution to enforce security policies. In a physical security analogy, a firewall is equivalent to a door lock on a perimeter door or on a door to a room inside of the building—it permits only authorized users such as those with a key or access card to enter. A firewall has built-in filters that can disallow unauthorized or potentially dangerous material from entering the system.

Since the grid-tracker router agent does not have a known destination, it does not include a destination address. An exemplary embodiment of the present invention uses a broadcast protocol, which does not look for a destination address. For example, the data packet going out onto the Internet is using TCP/IP, and is talking to every device it can find that uses TCP/IP, determining whether or not a remote resource is a suitable grid resource, and transmitting information that is used to build a routing table.

In conventional routing, only packets with a specific destination address or within a range of acceptable addresses, is permitted to flow into or out of firewall 26. A difference between conventional routing and an embodiment of the present invention is how the protocol is changed. The change in protocol is such that a packet is identified as being part of a grid job, and thus allowed to pass through the firewall despite not having a destination address. In an exemplary embodiment of the present invention, a special header may be included in the packet that identifies a packet as part of a grid job. In alternative embodiments of the present invention, such identification may be included as part of an existing header.

In an exemplary embodiment of the present invention using UNIX, true grid computing can be achieved by traversing the firewall in a different manner. In UNIX, there is network memory called sockets. Every socket has a socket number. Applications that communicate between sockets do so using socket numbers. So an application on an internal side of a firewall would be able to connect directly to a socket on the other side of the firewall by referring to a range of sockets.

Thus, in an exemplary embodiment of the present invention, true grid computing is achieved by enabling the free flow of traffic, regardless of source or destination address. Furthermore, embodiments of the present invention are not limited to allowing packets to pass from a local network to an external network such as the Internet. The embodiments of the present invention allow packets identified as part of the grid job to pass from the Internet into the local network.

Furthermore, in another exemplary embodiment, the grid router 20 and the firewall 26 is incorporated into a single device. Furthermore, the present invention may be realized in both hardware and software.

Several policy considerations may play a role when deciding to implement grid computing. If an entity considering grid computing has sufficient internal capacity to process their jobs, then it is not necessary to route a job outside of the entity's own local grid. The amount of resources may be thought of as the total resources of the entity, or the resources available at any particular time. If the resources available are insufficient to complete the job, then grid computing provides an advantage.

Sensitivity of data can effect a decision of whether to use grid computing. An entity will likely want to run processing involving sensitive financial data on local machines as opposed to going out to the grid (i.e, the external resources accessed via the Internet).

The degree of parallelism continues to drive the need for grid computing. A need for a high level of parallelism favors using grid computing.

Another consideration is intranet and Internet accessibility and availability. For true grid computing, Internet accessibility is necessary.

Another consideration is whether open or proprietary platform (hardware or software) is being used. If an enterprise is using proprietary hardware or software, the grid-router agents may not be able to locate compatible external resources.

Finally, platform security is a consideration in deciding whether to use grid computing. However, security does not have to play a role.

Figure 5:
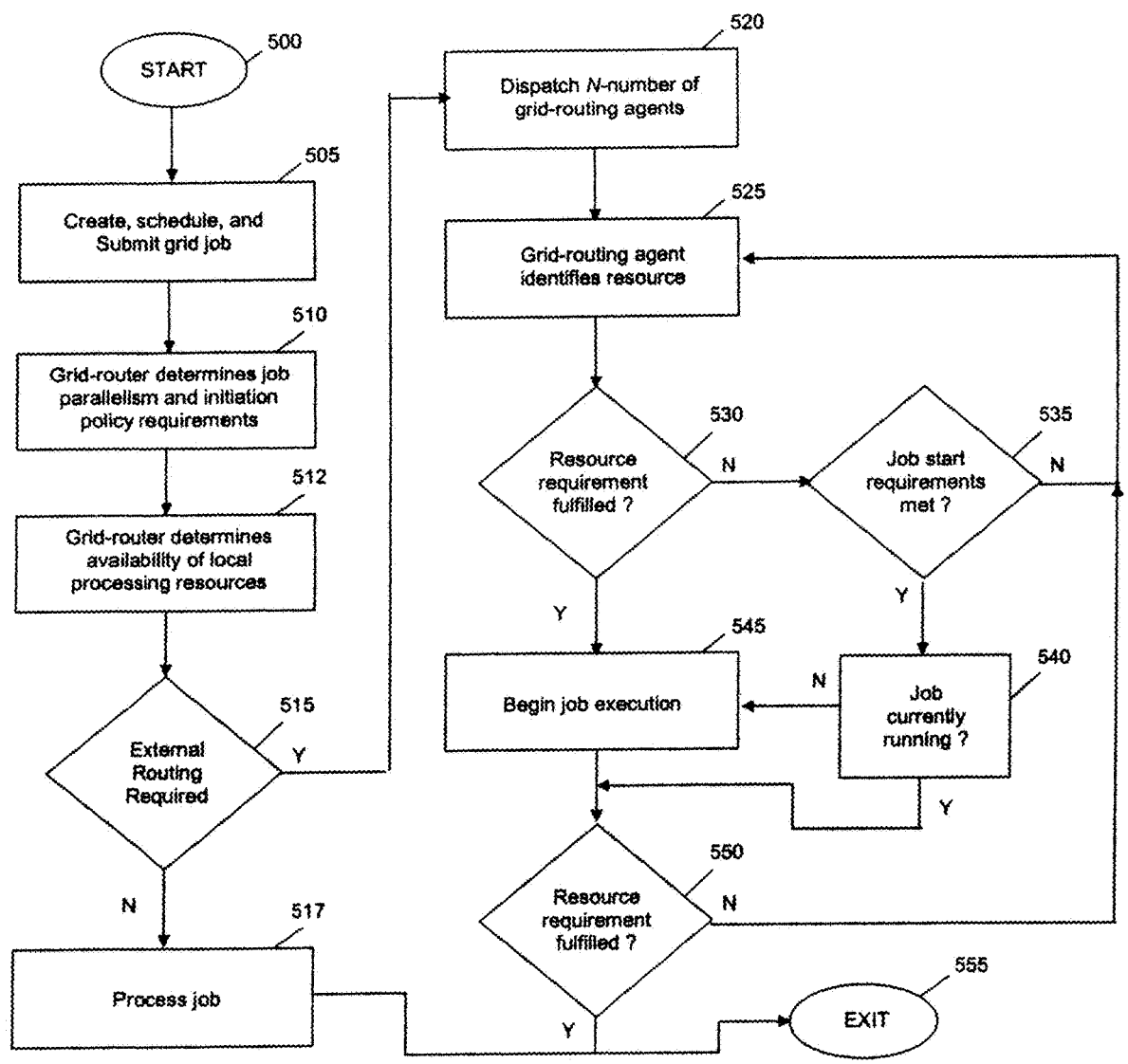
FIG. 5 is a flow chart showing an exemplary method of the invention.

FIG. 5 shows a flow chart of an exemplary method of the present invention. Step 500 marks the beginning of the process. In step 505, a grid job is created, scheduled and submitted for execution. This step is performed by, for example, a scheduler. Grid schedulers accept applications and grid jobs submitted by a user and provide a mechanism to deploy such grid jobs and applications on grid computing equipment based on scheduling policies. In step 210, a grid-router determines job parallelism and initiates policy requirements. In step 212, the grid-router determines the availability of local processing resources. If local processing resources are available and are adequate to complete the job, then no external routing is required in step 515, the job is processed by local processing resources in step 517, and the method ends at step 555.

However, if local processing resources are insufficient to complete the job, then in step 515 it is determined by the grid-router that external routing is required. The method then moves to step 520.

In step 520, the grid-router dispatches N-number of grid-routing agents. The grid routing agents are routed outside of the local network or transmitted through the firewall as explained above.

In step 525, the N-number of grid-routing agents identify remote resources to be used to process the grid-job. If the resource requirement is fulfilled (step 530), then job execution is begun in step 545. In step 550, additional resources can be added to the job if desired or necessary. In step 555, the method ends when the job is completed.

In an alternative embodiment, at step 530, if the resource requirements are not fulfilled, the method proceeds to step 535. At step 535, although the resource requirements are not fulfilled, if the job start requirements are met, the execution of the job can be initiated. At step 540, if the job is not currently running, then the method will proceed to step 545 and job execution will be started. If the job is currently running, then the additional resources will be added to the job. The method then proceeds to step 550 to determine if the resource requirement is met. If the resource requirement has been met, the method proceeds to step 555, where it ends when the job is completed. If the resource requirement has not been met at step 550, the method then proceeds to step 525, where the grid-routing agents continue to identify additional resources.

In an alternative embodiment, if the job start requirements are not met at step 535, then the method returns to step 525, and the grid-routing agents continue to identify additional resources.

Figure 6:
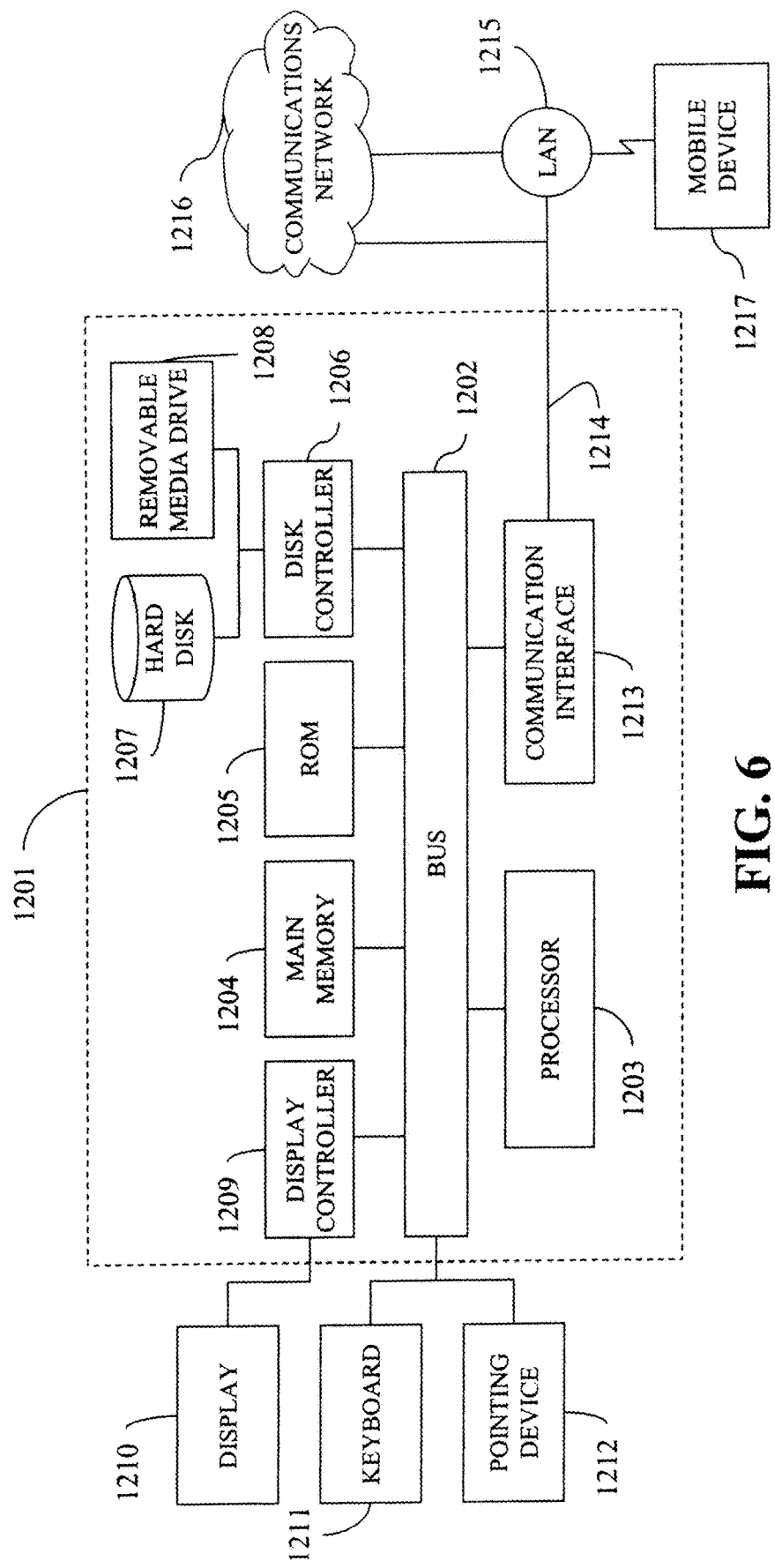
FIG. 6 is a block diagram of a computer system upon which an embodiment of the invention may be implemented.

FIG. 6 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The terms "computer readable medium" and "computer program product" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The foregoing description of possible implementations and embodiments consistent with the present invention does not represent a comprehensive list of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

The invention claimed is:

1. A method of routing data that is part of a grid job, comprising:
   receiving a data packet at a routing device in a first computer environment;
   determining whether the data packet is identified as part of the grid job; and
   routing the data packet that is identified as part of the grid job through a network and at least one firewall to a node in a second computer environment,
   wherein the data packet that is identified as part of the grid job does not have a destination address.

2. The method of claim 1, wherein the data packet is routed to the node in the second computer environment using a broadcast protocol.

3. The method of claim 1, wherein the data packet is identified as part of the grid job based on a difference in protocol of the data packet and a protocol of other packets that are not part of the grid job.

4. The method of claim 3, wherein the difference in protocol includes an additional header identifying the packet as part of the grid job.

5. The method of claim 3, wherein the difference in protocol includes adding an indication that the packet is part of the grid job in an existing header.

6. The method of claim 1, wherein the data packet is routed through an unrestricted socket in the at least one firewall.

7. The method of claim 1, wherein the network is the Internet.

8. An information processing device, comprising:
   circuitry configured to
   receive a data packet at a routing device in a first computer environment;
   determine whether the data packet is identified as part of the grid job; and
   route the data packet that is identified as part of the grid job through a network and at least one firewall to a node in a second computer environment,
   wherein the data packet that is identified as part of the grid job does not have a destination address.

9. The information processing device of claim 8, wherein the data packet is routed to the node in the second computer environment using a broadcast protocol.

10. The information processing device of claim 8, wherein the data packet is identified as part of the grid job based on a difference in protocol of the data packet and a protocol of other packets that are not part of the grid job.

11. The information processing device of claim 10, wherein the difference in protocol includes an additional header identifying the packet as part of the grid job.

12. The information processing device of claim 10, wherein the difference in protocol includes adding an indication that the packet is part of the grid job in an existing header.

13. The information processing device of claim 10, wherein the data packet is routed through an unrestricted socket in the at least one firewall.

14. The information processing device of claim 8, wherein the network is the Internet.

15. A non-transitory computer-readable medium encoded with computer-readable instructions that, when executed by a computer, cause the computer to perform a method comprising:
   receiving a data packet at a routing device in a first computer environment;
   determining whether the data packet is identified as part of the grid job; and
   routing the data packet that is identified as part of the grid job through a network to a node in a second computer environment,
   wherein the data packet that is identified as part of the grid job does not have a destination address.

16. The non-transitory computer-readable medium of claim 15, wherein the data packet is routed to the node in the second computer environment using a broadcast protocol.

17. The non-transitory computer-readable medium of claim 15, wherein the data packet is identified as part of the grid job based on a difference in protocol of the data packet and a protocol of other packets that are not part of the grid job.

18. The non-transitory computer-readable medium of claim 17, wherein the difference in protocol includes an additional header identifying the packet as part of the grid job.

19. The non-transitory computer-readable medium of claim 17, wherein the difference in protocol includes adding an indication that the packet is part of the grid job in an existing header.

20. The non-transitory computer-readable medium of claim 15, wherein the data packet is routed through an unrestricted socket in at least one firewall.

* * * * *